United States Patent Office 2,929,943
Patented Mar. 22, 1960

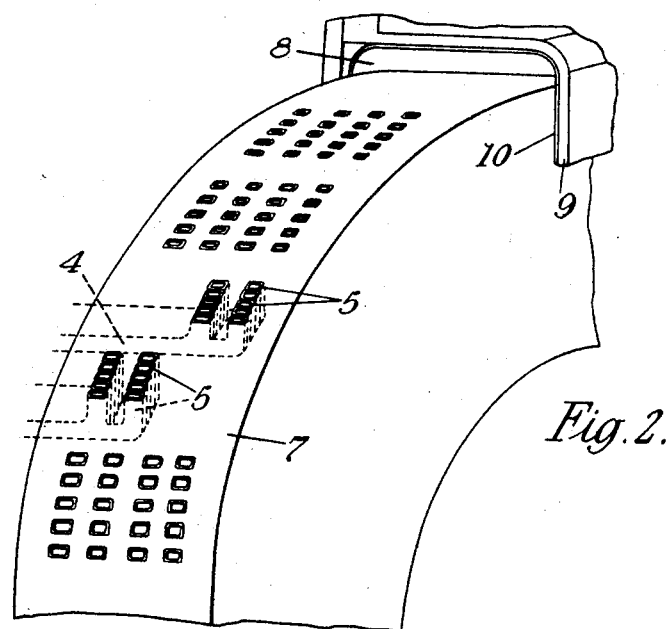
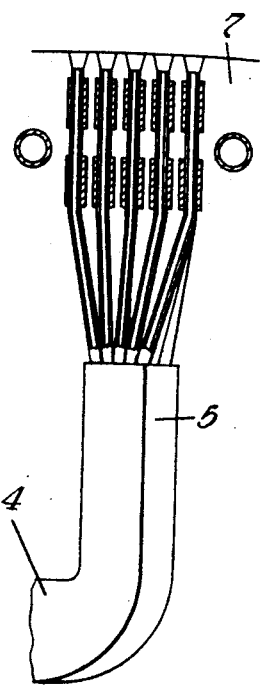
Fig. 2.
Fig. 3.

2,929,943

DYNAMO-ELECTRIC MACHINE COOLING STRUCTURE

Philip Richardson and Alfred P. Miller, both of Newcastle-upon-Tyne, England, assignors to C. A. Parsons & Company Limited, Newcastle-upon-Tyne, England Application December 24, 1956, Serial No. 630,385

Claims priority, application Great Britain January 11, 1956

3 Claims. (Cl. 310—64)

This invention relates to dynamo-electric machines particularly turbo-generators.

It is well known that one of the main factors limiting the output of a large dynamo-electric machine such as a turbo-generator is the rise in temperature caused by ohmic losses resulting from the flow of current through the conductors constituting the windings of the machine.

It is known to remove part of this heat by bringing a cooling fluid into direct contact with the conductors. In the stator this direct contact may be achieved by using hollow conductors through which the cooling fluid flows. The conductor may consist of a plurality of hollow conductor elements or a plurality of solid conductor elements spaced apart from each other to provide passage for cooling fluid.

One of the problems associated with this type of cooling as far as a stator winding is concerned is that of feeding a cooling fluid into or around the conductors at entry and collecting said fluid at the discharge end of the stator winding.

One method of supplying and collecting the cooling fluid is by means of a series of pipes connected to each conductor end or to a plurality of conductor ends these pipes being in turn connected to a common header.

The disadvantage of this method is the multiplicity of pipes required each of which must be constructed so as to prevent leakage of fluid and each of which must be suitably insulated to prevent current leakage between conductor ends particularly those of different phases.

The object of the present invention is to provide an improved construction of end winding for a dynamo-electric machine which enables a cooling fluid to be introduced into contact with the conductors constituting the winding and withdrawn therefrom and which avoids the use of a multiplicity of tubes.

The invention consists in a winding for a dynamo-electric machine having end portions extending beyond a magnetic core structure at each end thereof, which end portions are supported in a casing of electrically insulating material, openings being formed in a face of said casing which openings place conductors constituting the said end portions of the winding in communication with a cooling fluid in contact with said face.

The invention also contemplates the use of a casing enclosing one of the end walls, all of the end portions of the winding and the making of the conductors, which constitute the winding, hollow in order to allow for the passage of the cooling fluid therethrough.

The invention also consists in a stator winding for a dynamo-electric machine having end portions extending beyond a stator core structure at each end thereof, said end portions of the winding being supported in a casing of electrical insulating material, which casing has openings disposed in a direction which is generally radial with respect to the central axis of the stator, which openings connect the conductor ends with a cooling fluid in contact with the peripheral face of the said casing and housed in an annulus surrounding said peripheral end face.

The invention also consists in a winding for a dynamo-electric machine and in a dynamo-electric machine constructed and arranged substantially as described with reference to the accompanying diagrammatic drawings in which drawings:

Figure 2 shows a view of the peripheral end face of the insulating material surrounding the end portion of the conductors;

Figure 3 shows the end portion of a conductor partly in section.

Figure 1:
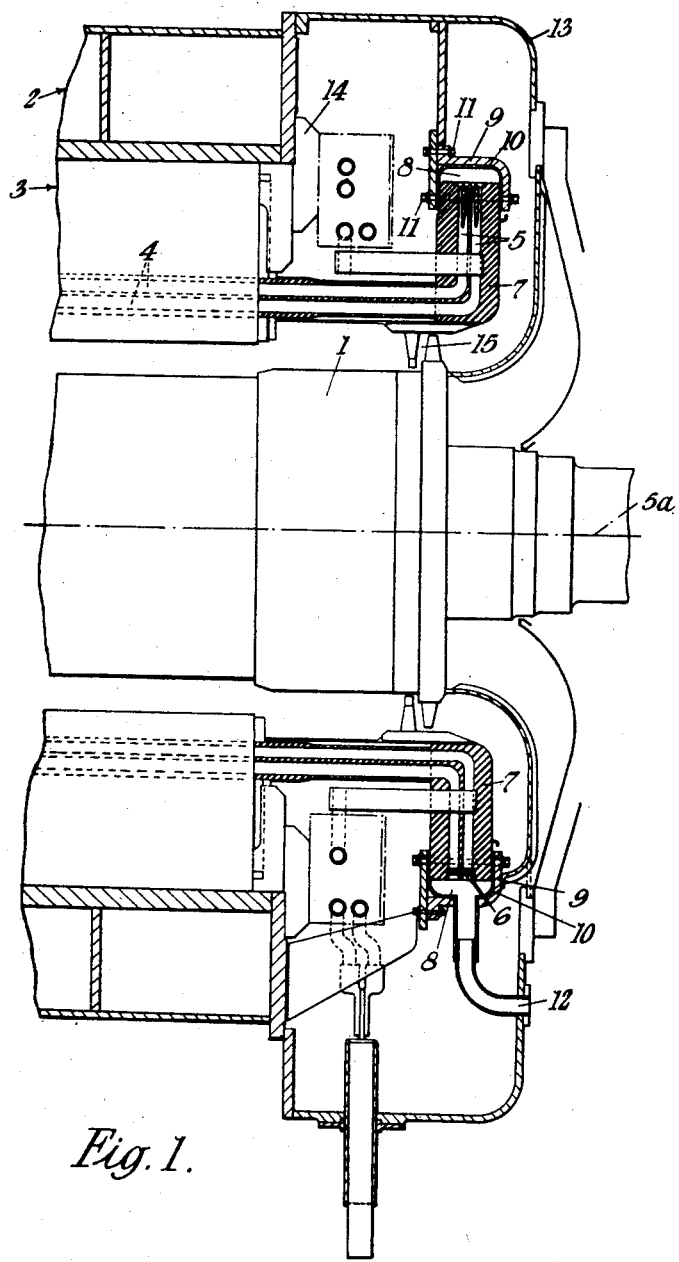
Figure 1 shows in part section the end part of a turbo-generator, the stator part only being in section.

In carrying the invention into effect in the form illustrated by way of example and referring to Figure 1, a turbo-generator comprises a rotor 1 and a stator 2. In a core 3 of the stator are housed conductors 4 the end portions of which extend beyond the core at each end thereof forming what will hereinafter be referred to as the end winding. Portions 5 of the conductors forming end windings are bent outwards at right angles to the generator axis 5a. Electrical connections 6 are made between the various conductors. The whole of the end windings are then encased in an insulating material 7.

Surrounding the peripheral end surface of the material 7 is an annulus 8 into which a cooling fluid, for example oil, is introduced. The annulus 8 is formed by a casing 9 which is preferably lined with a material 10 such as rubber to form an effective seal. The casing 9 is secured in position by bolts 11 which may be metallic or non-metallic.

Cooling fluid enters the annulus 8 through inlet pipes 12 and comes into direct contact with the conductors 4 before being discharged into a similar annulus (not shown) at the other end of the generator.

In the form shown each conductor is made up of a plurality of hollow conductor strands the cooling fluid flowing through each strand in direct contact with the material of the conductor.

Figure 2 as stated shows a view of the peripheral end face of the insulating material which has the reference and indicates the annulus 8 casing 9 and sealing rubber 10. The ends 5 of the conductors 4 are grouped according to phase; the electrical clearance between groups of different phase is greater than that between the individual conductors of each phase.

The conductors may terminate in the end face or may terminate a short distance below it as shown in Figure 3 in which a single conductor is shown. With this latter method the leakage distance between conductor ends through the fluid is increased.

The type of insulating material used may be an epoxy resin.

An advantage of the form of construction described for stator end windings is that the rigidity of the structure provides mechanical strength to withstand the electromagnetic forces which are set up in the end windings of a turbo-generator under fault conditions.

The insulating material is preferably cast in position and the cast structure can be supported from main end covers 13 of the stator or it may be supported by studs passing through the structure or through the casing 9 and screwed or otherwise secured to core end plate 14.

The complete end winding portions or only that part which extends in a radial direction may be encased. Whilst in Figure 1 a fan 15 is indicated for circulating a cooling gas over the rotor and stator the invention can be used with any other suitable system of cooling for the rotor and stator.

Transposition of the electrical connections 6 between end portion 5 of the conductor 4 may be arranged in various orders by twisting or bending or both twisting and bending the individual ends of each conductor element in the cast insulating material 7.

We claim:

1. A dynamo-electric machine comprising a rotor and a stator, an annular core within said stator, axially extending slots in said core, electrical conductors constituting the stator winding located in said slots and extending beyond said core at each end thereof and means for circulating a cooling fluid in direct contact with said conductors, the said means comprising a block of insulating material at each end of the stator core, each said block having ducts therein in which are located and supported the portion of the conductors extending beyond the stator core, said block extending beyond the ends of said conductors and said ducts continuing beyond the ends of the conductors to a terminal face of the block, and an annular chamber surrounding the terminal face of each block, the arrangement being that cooling fluid is circulated from an annular chamber at one end of the stator, flows through the ducts in said blocks and comes into direct contact with said conductors and is collected in the annular chamber at the other end of the stator.

2. A dynamo-electric machine as claimed in claim 1, in which the ends of the conductors in the end portions of the winding are bent in a radial direction.

3. A dynamo-electric machine as claimed in claim 2, in which the insulating material is cast around the end portions of the winding.

References Cited in the file of this patent
UNITED STATES PATENTS

| | | |
|---|---|---|
| 2,265,288 | Jones | Dec. 9, 1941 |
| 2,295,019 | Thomson | Sept. 8, 1942 |
| 2,390,130 | Sigmund | Dec. 4, 1945 |
| 2,462,451 | Winther | Feb. 22, 1949 |
| 2,727,161 | Kilner | Dec. 13, 1955 |
| 2,780,739 | Baudry | Feb. 5, 1957 |